INVENTOR.
PETER SAWCHUK

United States Patent Office 3,407,866
Patented Oct. 29, 1968

3,407,866
CERAMIC SEALS AND BEARING MEMBERS
Peter Sawchuk, Corning, N.Y., assignor to Corning Glass Works, Corning, N.Y., a corporation of New York
Continuation of application Ser. No. 157,998, Dec. 8, 1961. This application Sept. 1, 1966, Ser. No. 578,899
2 Claims. (Cl. 165—9)

ABSTRACT OF THE DISCLOSURE

Nonlubricated bearing or heat exchanger assembly for use over a broad temperature range and having two ceramic members with mated surfaces that slidably engage one another. One member, as a bearing member or rubbing seal for heat exchanger, has at least its mated surface made predominantly of one or more of the carbides of chromium, silicon, titanium and tungsten. The other member, as second bearing member or rotatable heat exchanger body, is a ceramically bonded structure made from petalite, glass-ceramics, borosilicate glass, mixtures of petalite and glass-ceramics, or mixtures of beta-spodumene and petalite.

*Cross reference to related application*

This is a continuation of application Serial No. 157,998, filed December 8, 1961, and now abandoned.

In some regenerative heat exchangers, structure termed a seal is provided to separate the intake gas sector of the exchanger from the exhaust gas sector, to prevent intermixing of the gases. Generally, the seal is stationary and the structure comprising the gas sectors rotates; consequently the seal must be closely fitted to the exchanger body and must slidably engage it in order to effectively prevent gas from leaking into the wrong sector.

For some purposes, the temperature of operation for such heat exchangers can range from a low of minus 20° F. to a high of 1200° F. or more. To avoid having to provide lubrication regularly during the operation, the parts should be matched so that a minimum of wear and friction result. The types of wear encountered can include adhesion of the two bodies in contact with one another by which particles may be pulled from the surface of one of them, abrasion in which hard particles of a hard surface cut a much softer one and oxidation in which oxide compounds form in the presence of air and flake off. Wear also results from imperfect fitting in which the parts vibrate relative to one another.

It is a primary object of the present invention to provide ceramic parts for use as ceramic bearing members, such as seals in heat exchangers for gas turbines and the like, in which but minimum wear is experienced in extended operations at elevated temperatures, and which are easily formed from readily available materials with skills now used in the ceramics art.

Figure 1:
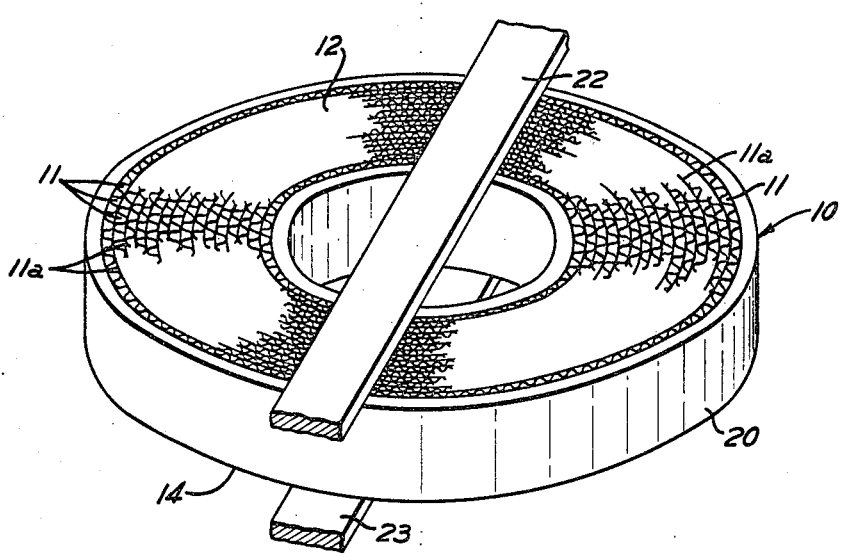
Figure 2:
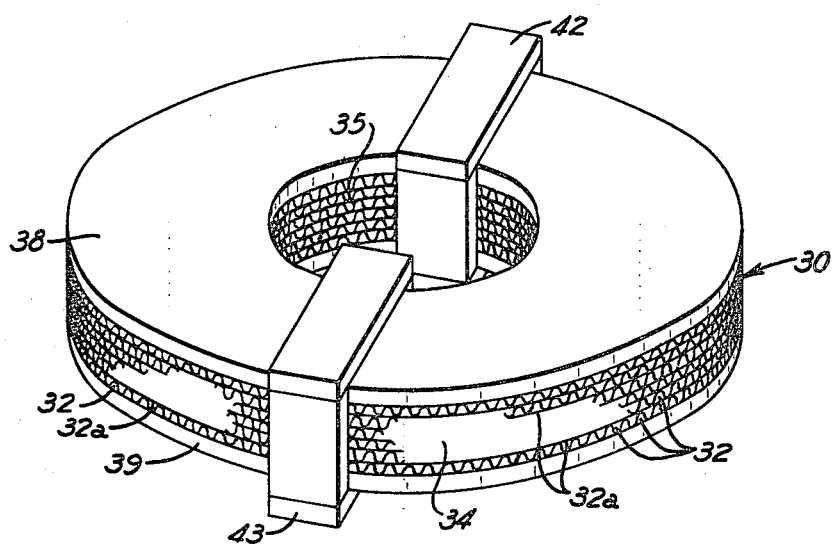

The invention will be best understood upon considering its description in conjunction with the attached drawing in which:

FIG. 1 is a perspective view of an axial flow heat exchanger body and seal member; and FIG. 2 is a perspective view of a radial flow heat exchanger body and a seal member.

Referring to FIGURE 1 of the drawing, the numeral 10 indicates generally an annular cylinder made of a ceramic material. Cylinder 10 is termed a honeycomb body and has unobstructed gas channels 11 separated from one another by ceramic walls 11a and extending through it from its top surface 12 to its bottom surface 14. For strength and protection, a rim member 20 is cemented to the outside surface of the annular cylinder 10.

Extending across the top 12 of the honeycomb cylinder is a first seal member 22. Seal member 23 is on the bottom surface 14 of the honeycomb directly under the first seal 22. Seal members 22 and 23 are in sliding engagement with the top 12 and bottom 14 surfaces of the annular cylinder 10. The seal members normally are stationary, and are supported in position relative to the annular cylinder by auxiliary structure that is not shown. While the seal members are shown as bars, it should be understood that they can be any shape desired and indeed may be shaped to facilitate gas passage to and from the exchanger.

In operation of the axial flow heat exchanger as shown in FIGURE 1, the annular cylinder 10 is rotated while high temperature gases from, for example, a gas turbine are passed through the gas channels 11 from the bottom 14. The gas is fed through ducts (not shown), and always is fed to the gas channels at one side of the seal. That portion of the cylinder can be denominated the first radial sector, while the remaining portion of the cylinder on the other side of the seal is called the second radial sector. Rotation of the cylinder 10 generally is accomplished by means that act on the rim 20 or on the central hub affixed to the cylinder in the central hole.

Rotation continuously brings new channels 11 of the annular cylinder 10 into alignment with the path of the gas from the turbine. The heated gas heats the walls 11a of the gas channels 11 of the cylinder and then escapes out of the top 12 and is passed to exhausting means. The channel walls 11a heated in the first radial sector, being continuously rotated, advance under the seal member 22 into the second radial sector. Fresh intake gas from a compressor and at a low temperature is passed from the top 12 into the channels 11 in the second radial sector. The gas absorbs and recovers heat from the channel walls 11a in the second sector and then escapes out of the channels from the bottom 14 of the cylinder 10. The heated gas from the second sector then is passed to a burner where its temperature is raised higher. Gas from the burner is expanded through the turbine to convert its heat to work and thereby complete the cycle.

FIG. 2 shows a radial flow type heat exchanger which comprises an annular cylinder 30 having gas channels 32 that extend from the outside wall 34 inwardly and terminate at the inside wall 35 in the central hole of the cylinder 30. Ceramic rims 38 and 39 are joined to the top and bottom of annular cylinder 30. The annular cylinder 30 is divided, as to relative position, into two flow sections by seal bands 42 and 43 that slidably engage the annular cylinder at its outside wall 34 as well as its inside wall 35. These bands can go completely around the body and thus over the rim members 38 and 39 at the top and bottom of the annular cylinder 30. Suitable supporting structure for the seals including a wall that extends between the two seals in the central aperture of the cylinder may also be provided.

In operation of the radial flow exchanger, the annular cylinder 30 is rotated as hot exhaust gases from a turbine are directed into the gas channels 32 of the first radial sector of the cylinder. To minimize ductwork, this frequently is fed from the central hole of the cylinder 30. Thus, the gas passes outwardly from the side 35 to the side 34 of the first sector and is exhausted after the heat has been absorbed by the ceramic wall 32a structure in that sector. Rotation of the cylinder 30 continuously brings new channels within the first radial sector into which hot exhaust gases are fed. Simultaneously, the advancing portions of the cylinder 30 pass by the seal into the second radial sector in which fresh intake gas from a compressor is passed. The gas from the compressor suitably enters from the outside wall 34 in the second sector and is collected by ductwork at the inside wall 35 in the central hole and then is passed to a burner as noted with FIG. 1 above. Thus, the gas from the compressor absorbs and recovers heat from the ceramic walls 32a previously heated by the exhaust gases while in the first sector. It will be apparent to the artisan that the direction of gas flow in either exchanger can be reversed if design considerations indicate that it is desirable.

For efficiency, it is necessary to avoid having material amounts of gas carried from sector to sector along the outside wall 34 or the inside wall 35. Seals 42 and 43 slidably engage those walls of the cylinder surfaces and serve to prevent gas flow along those surfaces.

In order that the seals can perform as required for extended periods of time, they must not wear themselves or cause undue wear of the cylinder faces. That object is readily achieved in accordance with my discoveries by making the seals from one or more (e.g. mixtures) of the carbides of chromium, silicon, titanium and tungsten. Other materials in minor amounts, to serve as binders, extenders and the like, can be present in the seal members as long as the bearing surface is predominantly of those carbides. For example, mixtures of titanium carbide, nickel and molybdenum can be used. Silicon and nickel have been used for bonding purposes with silicon carbide and titanium carbide, respectively, without adverse effect. The seal can be a rigid member composed of the carbide, or it can be formed by coating a core of iron or the like with the carbide. Carbide bars or other seal shapes can be prepared in accordance with known practices involving pressing and sintering the carbides to the desired shape. Seals can also be prepared by slip casting and similar techniques available to the art.

In order to achieve the results indicated hereinafter, it is essential that surfaces mated with the seal be formed from particular materials. Suitable materials for that purpose include petalite, glass ceramics, especially as disclosed in United States patent to Stookey, Number 2,920,971, borosilicate glasses as disclosed in the United States patent to Hood et al., Number 2,106,744, mixtures of 60 to 90 percent of petalite and 10 to 40 percent of glass ceramics and mixtures of 20 to 80 percent petalite and 80 to 20 percent of beta spodumene. Such materials are used in forming the honeycomb cylinders for use in the invention, as well as to form rim and hub members.

Honeycomb structural bodies that are used in the heat exchange bodies of this invention are made preferably according to the process in the copending application of Robert Z. Hollenbach, Serial No. 759,706, filed September 8, 1958, now Patent 3,112,184 dated November 26, 1963. Briefly, that process involves depositing pulverized ceramic material and a binder on a flexible carrier, corrugating the resulting coated carrier, forming an article of the desired shape from corrugated carrier either alone or in conjunction with non-corrugated carriers and thereafter firing the composite article to sinter the ceramic particles to produce a unitary structure. It is preferred that the binder and flexible carrier be of organic material so that they are removed by decomposition and volatilization when the article is fired; in that instance, there results an article that is substantially all ceramic material. The honeycomb structure can be produced by, among other ways, rolling a corrugated and non-corrugated carrier on a reel to produce an annular cylinder having the requisite dimensions. Alternatively corrugated and non-corrugated carriers can be stacked to achieve the desired dimensions and then sintered to produce a unitary body. Thereafter, the resulting structure can be cut to the shape required for the present invention. Full details on forming suitable honeycombs including numerous examples of binders, carriers, firing procedures and the like can be found in the cited copending application of Robert Z. Hollenbach, to which reference can be made. It should also be noted that suitable honeycomb assemblies can be made from extruded ribbons of a ceramic and binder mixture.

The invention has been demonstrated by a large number of tests that were standardized in order to provide data on a comparable basis. Exchanger material specimens were fabricated in the form of ½-inch thick blocks having a square face 2¼ inches on a side and a ¾-inch diameter hole at the center. The seal specimens were prepared in the form of ¼-inch thick washers having a 2 inch outside diameter and a ¾-inch inside diameter. The plane surfaces of each specimen were ground flat and parallel and were carefully cleaned to remove all greases and other surface contamination by scrubbing with an organic solvent, rinsing in water, washing with ethyl alcohol and drying in room air.

The exchanger specimens were placed on a rotating table in a furnace capable of obtaining high temperatures. The seal washer specimens, connected to the end of a shaft, were placed against the rotating surface of the exchanger material. The exchanger specimens were rotated at a speed of 157 feet per minute, measured at the periphery of the specimens, and the seals were maintained against the exchanger specimens under an apparent contact load of 2.3 p.s.i.

In conducting these tests, the specimens were held at the test temperature for 15 minutes before each run, and then were held for one hour at the test temperatures, which were maintained within 10 degrees of the test temperature after initial temperature stabilization. At the end of a test at a given temperature, the specimen surface was checked for the amount of wear and condition of the surface. Tests were conducted at 77° F., 600° F., 1000° F. and 1200° F. The results were consistent, and accordingly the data reported in the table hereinafter are limited to those obtained at 600° F. and at 1200° F.

In conducting these tests, several different commercially available silicon carbides were used and are differentiated in the table by numbers. That indicated (1) is a silicon carbide that contains 45 percent by weight of graphite. That indicated by (2) is a silicon bonded silicon carbide and (3) is a self-bonded silicon carbide. The letters A, B, C and BB under the title "Exchanger" in the tabulated material indicate materials as follows: A is a ceramic composed, by weight, of 75 percent of petalite and 25 percent of glass ceramic B; B is a glass-ceramic having an analysis, in weight, of 70 percent of $SiO_2$, 18 percent of $Al_2O_3$, 5 percent of $TiO_2$, 3 percent of $Li_2O$, 3 percent of MgO and 1 percent of ZnO; C indicates a borosilicate glass as disclosed in the United States Patent to Hood et al., Number 2,106,744; and BB is a slip cast composition of, by weight, 75 percent of petalite and 25 percent of glass ceramic B.

The data obtained are:

TABLE

| Seal | Ex-changer | Friction Co-Efficient | | Wear: Inches/Hour | | | |
|---|---|---|---|---|---|---|---|
| | | | | Seal | | Exchanger | |
| | | 600° F. | 1,200° F. | 600° F. | 1,200° F. | 600° F. | 1,200° F. |
| Chromium Carbide | A | 0.58 | 0.38 | 0.0002 | 0.0001 | 0.0001 | None |
| Do | B | 0.54 | 0.42 | None | 0.0001 | None | None |
| Do | C | 0.33 | 0.35 | None | None | 0.0001 | None |
| Silicon Carbide (1) | A | 0.12 | 0.24 | None | None | None | 0.0232 |
| Silicon Carbide (2) | A | 0.21 | 0.29 | None | None | 0.0047 | 0.0099 |
| Do | B | 0.34 | 0.34 | None | None | 0.0005 | 0.0002 |
| Do | C | 0.20 | 0.31 | None | None | None | 0.0001 |
| Silicon Carbide (3) | A | 0.17 | 0.27 | None | None | 0.0033 | 9.0063 |
| Do | B | 0.21 | 0.47 | None | None | None | None |
| Do | C | 0.11 | 0.28 | 0.0001 | None | None | None |
| Titanium Carbide | A | 0.53 | | None | | 0.0002 | |
| Do | B | 0.65 | 0.53 | None | None | None | None |
| Do | C | 0.38 | 0.76 | None | None | None | None |
| Chromium Carbide on Cast Iron | A | 0.31 | 0.49 | None | 0.003 | 0.0020 | 0.0063 |
| Do | B | 0.59 | 0.68 | None | None | None | None |
| Do | C | 0.59 | 0.52 | 0.0001 | None | 0.0004 | None |
| Do | BB | 0.57 | 0.69 | None | 0.0001 | 0.0001 | None |
| Silicon Carbide (3) | BB | 0.28 | 0.31 | None | None | None | None |
| TiC-Ni-Mo | A | 0.11 | 0.71 | None | 0.0001 | None | 0.0014 |
| Do | B | 0.57 | 0.58 | None | None | None | None |
| Do | C | 0.50 | 0.66 | None | None | None | None |

From these data it is evident that bearing members of carbides in accordance with this invention are uniquely suited to intermediate and high temperature service in that they experience little or no wear and cause very little wear on the mated members despite the absence of lubricant. In view of these excellent results, several of the materials were subjected to extended running periods that ranged to a high of 200 hours for chromium carbide on glass-ceramic exchanger materials. Specimens of silicon-bonded as well as self-bonded silicon carbide were run for 100 hours on glass-ceramic exchanger materials. In these as well as shorter tests with titanium carbide and sprayed chromium carbide, the same pattern of little or no wear on either part of the test structure was found.

In view of the fine results obtained as reported in the data above, several tests were conducted at the significantly higher temperature of 1400° F. Chromium carbide was selected as the seal material for this higher temperature test and five different exchanger materials were used. The tests extended from 22 to 62 hours, but were otherwise similar to the basic tests indicated above. It was found that the wear rates on both the seal material and the exchanger material were even lower at 1400° F. than at 600° F. and 1200° F. as reported above. Examination of the surfaces of the exchanger and seal materials after this high temperature test showed a thin adherent film on the exchanger material and a polished appearance, that was glossy in one instance, on the seal specimens. The highest wear in this test of any of the materials, either seal or exchanger, was 0.00007 inch/hour.

From the foregoing data and description it is apparent that the present invention provides mated members that can be used as gas seals and bearing members over large temperature ranges for extended periods without encountering deleterious wear. Moreover these results are achieved despite the fact that no lubricant was used at the interface, or elsewhere, of the surfaces.

All percentages given in this specification are by weight unless otherwise stated.

In accordance with the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A non-lubricated bearing for use over a broad temperature range comprising two members having mated surfaces in sliding engagement with one another, one of said members having at least said mated surface thereof made predominantly of one or more of the carbides selected from the group consisting of chromium carbide, silicon carbide, titanium carbide and tungsten carbide, and the other of said members comprising a ceramically bonded structure made from a material selected from the group consisting of petalite, glass-ceramics, borosilicate glass, mixtures of petalite and glass-ceramics and mixtures of beta-spodumene and petalite, said mated surface of said other of said members formed by said bonded structure.

2. In combination with a rotatable ceramic heat exchanger comprising a ceramic honeycomb body having unobstructed gas passages extending therethrough and terminating on opposing surfaces of said body, in which said body is made from a material selected from the group consisting of petalite, glass-ceramics, boroscilicate glass, mixtures of petalite and glass-ceramics and mixtures of beta-spodumene and petalite, a rigid seal member having a surface mated to and in sliding engagement with said body at one of said opposing surfaces, at least said surface of said member being made predominantly of one or more of the carbides selected from the group consisting of chromium carbide, silicon carbide, titanium carbide, and tungsten carbide.

References Cited

UNITED STATES PATENTS

| | | | |
|---|---|---|---|
| 2,253,969 | 8/1941 | Dawihl | 29—182.7 X |
| 3,000,846 | 9/1961 | Runton et al. | 277—96 X |
| 3,057,604 | 10/1962 | Bubniak et al. | 165—9 |
| 3,081,822 | 3/1963 | Wolansky et al. | 165—10 |

FOREIGN PATENTS

| | | |
|---|---|---|
| 626,559 | 8/1961 | Canada. |
| 811,434 | 4/1959 | Great Britain. |

ROBERT A. O'LEARY, *Primary Examiner.*

T. W. STREULE, *Assistant Examiner.*